Oct. 6, 1936. E. H. SCHULTZ 2,056,371

TANDEM WHEEL ATTACHMENT

Filed June 7, 1935 3 Sheets-Sheet 1

INVENTOR.
E. H. Schultz
BY
Morsell, Liebert & Morsell
ATTORNEYS.

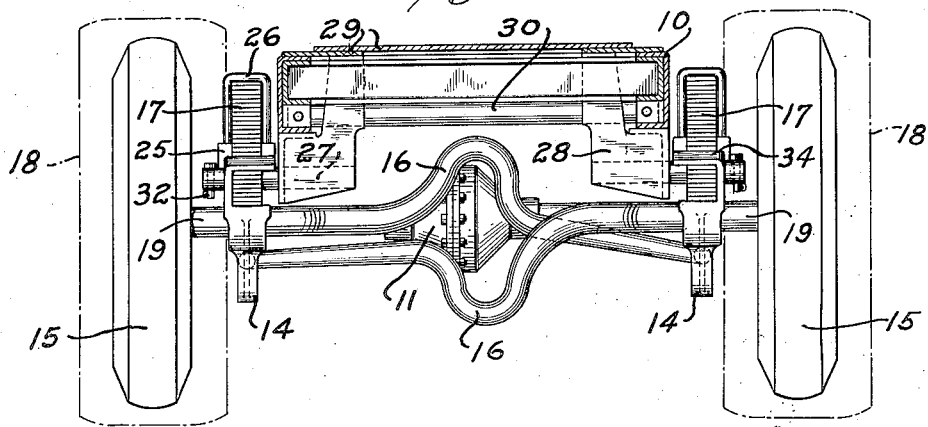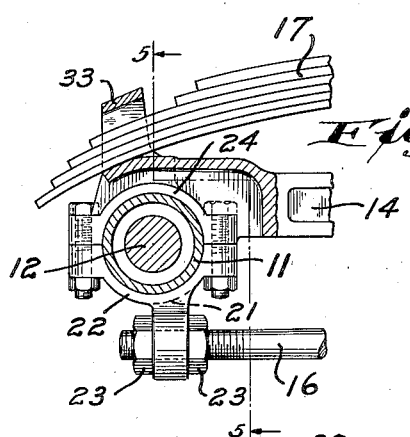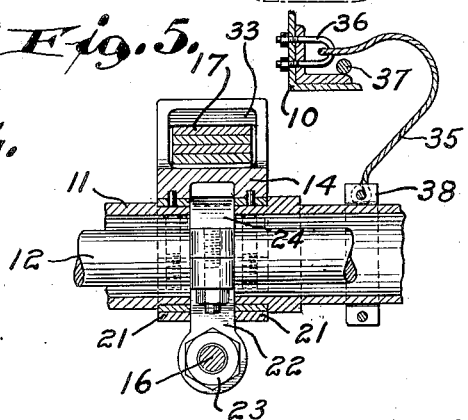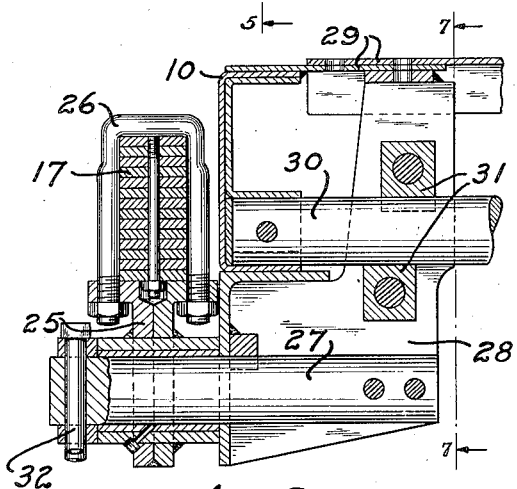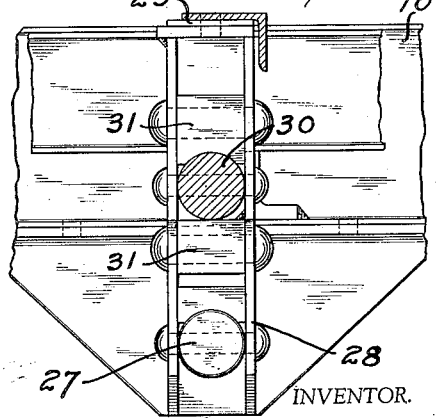

Oct. 6, 1936.  E. H. SCHULTZ  2,056,371
TANDEM WHEEL ATTACHMENT
Filed June 7, 1935   3 Sheets-Sheet 3
Fig. 8.
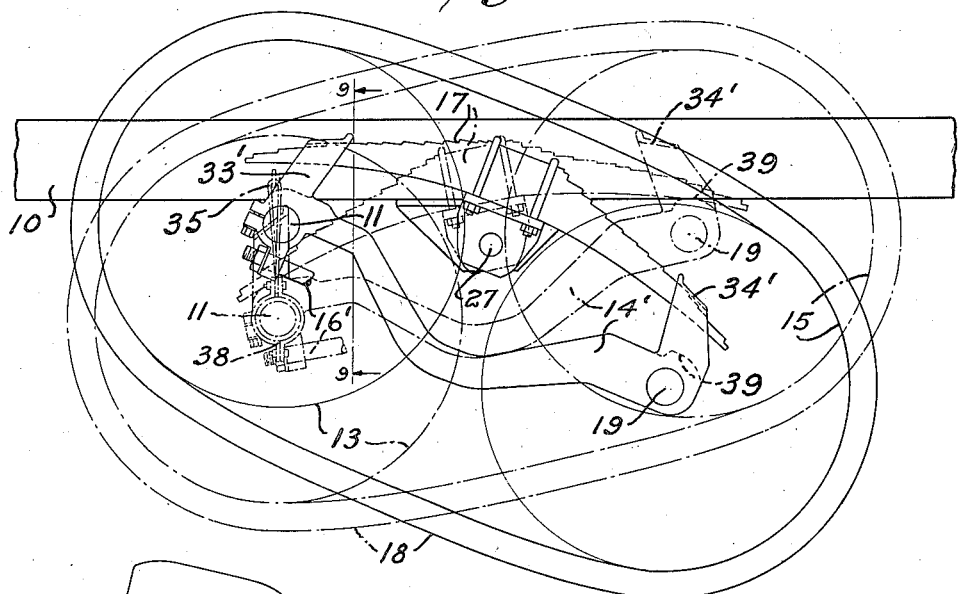
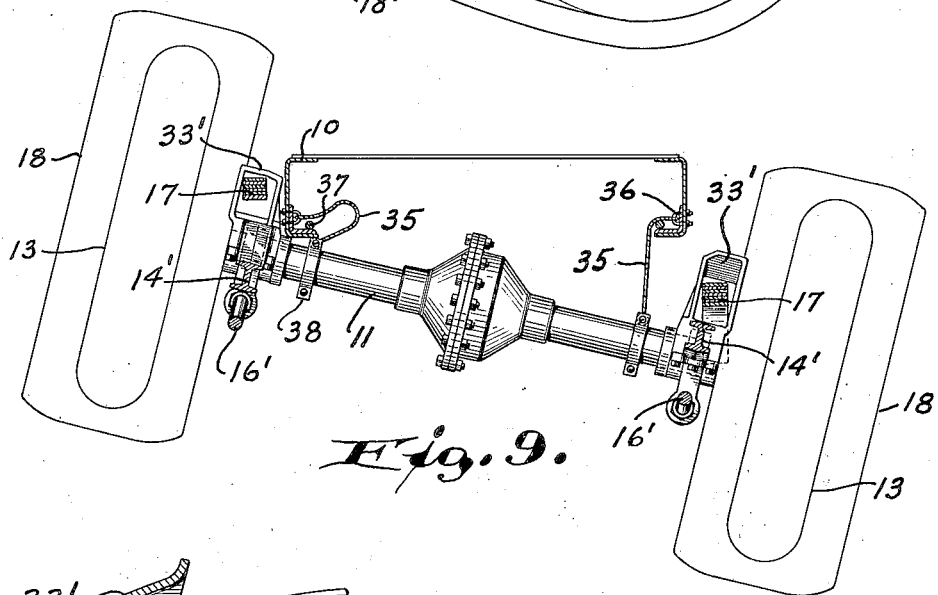
Fig. 9.
Fig. 10.
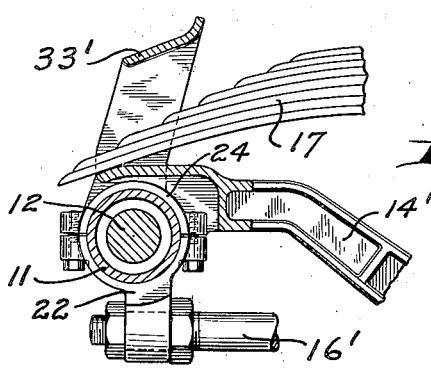
INVENTOR.
E. H. Schultz
BY
Morsell, Liebert Morsell
ATTORNEYS.

Patented Oct. 6, 1936

2,056,371

UNITED STATES PATENT OFFICE 2,056,371

TANDEM WHEEL ATTACHMENT

Edward H. Schultz, Milwaukee, Wis.

Application June 7, 1935, Serial No. 25,395

14 Claims. (Cl. 280—124)

The present invention relates in general to improvements in vehicles, and relates more specifically to improvements in the construction and operation of tandem wheel attachments especially applicable to road vehicles for the purpose of increasing the ground engaging area.

Generally defined, an object of the present invention is to provide a simple and durable tandem wheel assemblage, which is highly effective in use.

While it has heretofore been proposed to provide various types of tandem wheel attachments for increasing the supporting area and the traction of relatively light trucks, none of these prior assemblages have proven entirely and commercially satisfactory for various reasons. Such an attachment should not only be readily applicable to and removable from the rear axles of standard motor driven and other vehicles, but it must combine simplicity and lightness with strength and durability. The tandem wheel attachment should effectively support the load irrespective of irregularities in the road, and must avoid interference with normal operation of the vehicle. Attachments of this type should moreover be adapted to effectively cooperate with endless track or tread mechanisms, without necessity of disturbing the normal supporting wheels, and none of the prior assemblages of this type have been designed or constructed to meet all of these requirements.

It is therefore an object of the present invention to provide a commercially practicable tandem wheel attachment of improved construction, which meets all of the above mentioned specific requirements, and which is relatively inexpensive to install and operate.

A more specific object of the present invention is to provide an improved assemblage for materially increasing the ground engaging area of a road vehicle, which is readily applicable as a unit to various types of wheeled conveyances.

Another specific object of the invention is to provide a strong tandem wheel attachment of extremely simple construction, wherein the tandem wheels of each set are positively confined to rotation in the same plane and about parallel axes.

A further specific object of the invention is to provide a new and useful vehicle supporting structure which will effectively support and distribute the load over relatively great ground engaging area, without in any manner interfering with the vehicle propelling or draft mechanisms.

Still another specific object of the invention is to provide an improved multiple wheel attachment which utilizes standard wheels adapted to either directly engage the ground, or to effectively cooperate with endless track or tread mechanism.

An additional specific object of the invention is to provide an improved assemblage especially applicable to light motor driven trucks, for increasing the ground engaging and tractive area of the truck support without materially increasing the cost of transportation.

A further specific object of the invention is to provide an improved tandem wheel attachment which is extremely flexible in action, and which will function effectively on abnormally rough and uneven ground.

These and other objects and advantages will be apparent from the following detailed description.

A clear conception of an embodiment of the present invention, and of the mode of constructing, applying and operating tandem wheel attachments built in accordance therewith, may be had by referring to the drawings accompanying and forming a part of this specification wherein like reference characters designate the same or similar parts in the various views.

Fig. 3 is a part sectional rear view of the assemblage of Figs. 1 and 2;

Fig. 4 is an enlarged fragmentary central longitudinal vertical section through the front end of one of the side frame members of the attachment;

Fig. 5 is a similarly enlarged transverse section through the front end of the side frame member showing an improved type of motion limiting attachment, the section being taken along the line 5—5 of Fig. 4;

Fig. 6 is a similarly enlarged vertical section through the center of one of the spring supports;

Fig. 7 is a similarly enlarged vertical section through the support of Fig. 6, taken along the line 7—7;

Fig. 8 is a diagram showing a modified type of the improved tandem wheel attachment, with the tandem sets of wheels on opposite sides of the assemblage displaced to extreme positions;

Fig. 9 is a somewhat diagrammatic sectional view of the modified structure of Fig. 8, the section being taken along the line 9—9; and Fig. 10 is an enlarged fragmentary central longitudinal section through the front end of one of the side frame members of the modified assemblage.

Figure 1:
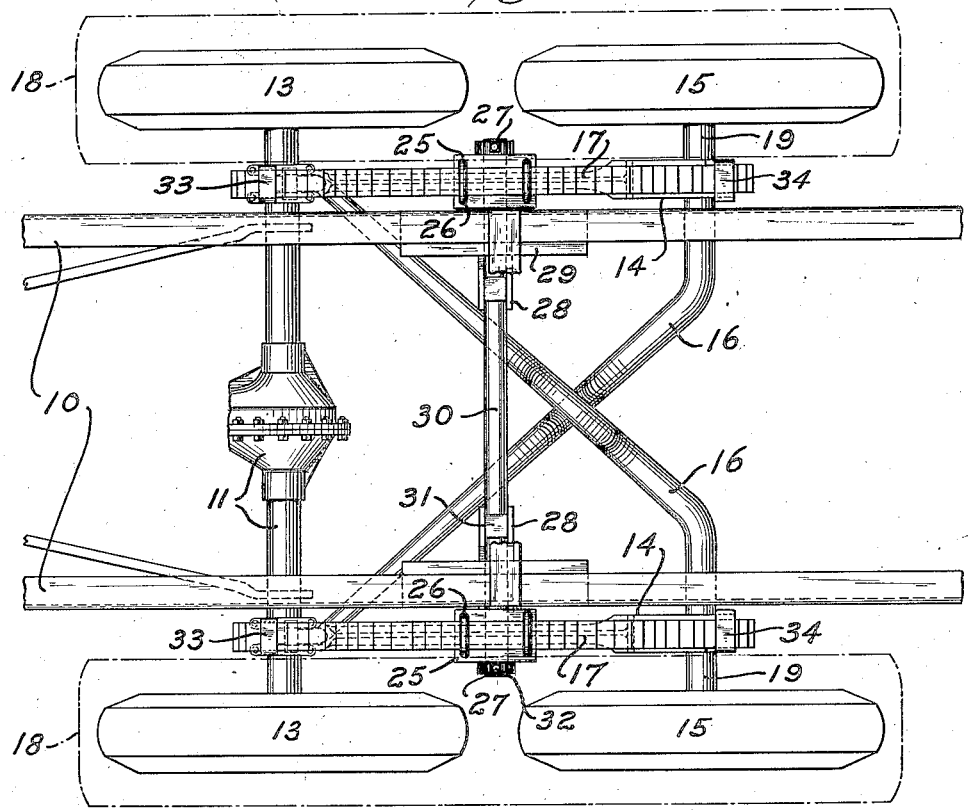
Fig. 1 is a top view of the improved tandem wheel attachment, showing the same applied to a fragment of a motor propelled vehicle, and also showing outlines in dot-and-dash lines, of endless track mechanisms applied to the wheels.

While the invention has been shown and described herein as having been embodied in a detachable tandem wheel attachment applied to the rear axle and chassis or frame of a light motor driven truck, it is not intended to unnecessarily restrict the scope by such specific embodiment and application, since the improved features may obviously be more generally applicable to tandem wheel assemblages for other classes of vehicles.

Referring to Figs. 1 to 7 inclusive of the drawings, the improved tandem wheel assemblage comprises in general an ordinary vehicle frame 10 of suitable construction adapted to directly support a load; an axle extending across the frame 10 and consisting of a housing 11 and alined half-shafts 12 rotatably supported within the housing; front main or drive wheels 13 driven by the outwardly projecting ends of the half-shafts 12 on opposite sides of the frame 10; a side beam or frame member 14 swingably supported by the housing 11 of the front axle on each side of the frame 10 adjacent to each of the drive wheels 13; a complementary or auxiliary wheel 15 rotatably associated with the swinging end of each frame member 14 remote from the front axle; a swingable rod or rear axle 16 rotatably supporting each auxiliary wheel 15 and connecting the swinging portion of each frame member 14 with a portion of the axle housing at the opposite side of the frame 10; and leaf springs 17 providing resilient direct supports for the opposite sides of the frame 10 and having front and rear ends movably coacting with the corresponding ends of the adjacent frame members 14.

The frame 10 is ordinarily provided with a body for confining the load, and the ends of the rotary half-shafts 12 which are disposed within the housing 11, are positively driven from the motor of the vehicle through the usual transmission and differential gearing. The wheels 13, 15 may be of standard construction having the usual removable solid or pneumatic rubber tires, and may be caused to either directly engage the ground, or to cooperate with ground engaging flexible endless track or tread mechanisms 18, as shown in dot-and-dash lines in Figs. 1, 2, and 3. In some cases, the rear or auxiliary wheels 15 may also be positively driven by means of sprocket chain drives connecting the hubs of the complementary wheels 13, 15 of each set, but the use of such positive drives is optional, and the disclosure thereof has been omitted in order to avoid confusion. The auxiliary wheel 15 of each set is rotatably mounted upon a journal portion 19 which may be formed integral with or attached to the swinging end of the adjacent rear axle 16, and these journal portions 19 are rigidly attached to blocks 20 which may be either fixedly or adjustably confined within elongated openings in the swinging ends of the corresponding side frame members 14. The wheels 13, 15 of each set are always maintained in the same plane perpendicular to the axes of their supporting axles, and the axes of rotation of the wheels 13, 15 of each set are always retained parallel to each other, irrespective of the fact that the two sets of wheels are independently swingable or oscillatable about the common axis of the half-shafts 12. Although the housing 11 is capable of tilting to a limited extent up and down relative to the chassis frame 10, it is maintained normal relative to the drive shaft by the usual radius rods as shown in Figs. 1 and 2.

The side frame members 14 are of relatively rigid construction, and the forward end of each of these frame members is bifurcated as shown in Figs. 4 and 5, and is pivotally but detachably secured either directly to or near the adjacent portion of the axle housing 11, by means of laterally spaced caps 21. The swingable rear axles 16 cross each other beneath the center of the frame 10 and are bent to clear each other, as clearly shown in Figs. 1, 2, and 3; and the end of each rear axle 16 nearest the front axle, may be either fixedly or adjustably attached to a pivot element 22 by any suitable means such as clamping nuts 23. Each pivot element 22 is swingably suspended from the axle housing 11 within the bifurcation of the adjacent frame member 14, and is held in place by a removable cap 24 as clearly shown in Figs. 4 and 5; and each of these pivot elements 22 is oscillatable with its cooperating rear axle 16 and frame member 14, without interfering with the other set of similar cooperating parts. As previously indicated, each journal portion 19 may be rigidly attached to the swinging end of the adjacent frame member 14, so that the cooperating frame member 14, wheel 15, and swinging axle 16 of each set must swing simultaneously about the common axis of the alined half-shafts 12, at all times, thus positively maintaining the wheels 13, 15 of each set in the same plane at all times, as hereinabove described.

Figure 2:
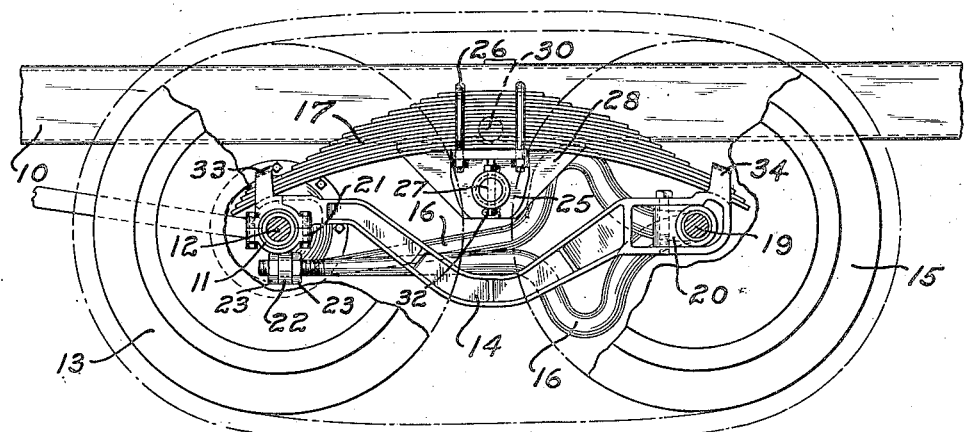
Fig. 2 is a side view of the attachment and tractor parts shown in Fig. 1, the major portions of the wheels having been broken away in order to avoid obstructing the view of other parts.

Each of the leaf springs 17 has its medial portion secured to a bracket 25 by means of U-bolts 26 as clearly illustrated in Figs. 2 and 6, and the brackets 25 are pivotally supported upon alined stub shafts 27 secured to frames 28 and projecting outwardly from the opposite sides of the frame 10. The frame 10 rests directly upon the frames 28 and these frames are rigidly attached to top plates and angles 29 secured to and spanning the frame 10. The cross-brace or rod 30 is also rigidly attached to and spans the chassis 10 some distance above the stub shafts 27, and is secured to the frames 28 by means of clamping blocks 31 and rivets, as shown in Figs. 6 and 7, thereby providing a durable mounting and connection between the springs 17 and frame 10 without interfering with the upward swinging movement of the tie axles 16. The rod 30 merely serves to stiffen the chassis 10, and this rod as well as the frames 28 may be replaced by any other suitable bracing and spring supporting structure. The brackets 25 are swingably confined upon the stub shafts 27 by means of collars and pins 32, and the opposite free ends of each spring 17 slidably engage and rest upon the opposite ends of the corresponding side frame member 14 being confined within integral yokes 33, 34 as indicated in Fig. 4. The front yokes 33 are closed on both sides, but the rear yokes 34 are open on the inner sides and if so desired, the spring ends may be movably attached to the ends of the frame members 14 by means of shackles of well known construction, or otherwise, in order to permit free flexing of the springs 17 during normal operation of the assemblage, and also to allow swinging movement of the entire tandem attachment as a unit. In order to limit the downward movement of the housing 11 away from the main vehicle frame 10, the housing may be connected to the frame on each side of the latter, by means of a flexible cable loop 35 as shown in Fig. 5. The upper end of each cable loop 35 is pivotally attached to the adjacent side beam of the frame 10 by a clevis 36 and is adapted to bend over a curved abutment 37 when the cable is taut, and the lower end of the loop 35 coacts with a clamping collar 38 secured to the housing 11.

When the improved tandem wheel attachment of Figs. 1 to 7 inclusive, has been properly assembled and applied to the frame 10 of a vehicle, and the motor of the vehicle is operating, the drive wheels 13 may be set in motion to transport the vehicle along the ground in a well known manner. If either of the front wheels 13 engages an obstruction, the obstructed wheel will be elevated, thereby causing tilting of the axle housing 11 relative to the frame 10, such relative movement being permitted by the adjacent leaf spring 17. During raising of the obstructed wheel 13 away from the ground, and before the complementary auxiliary wheel 15 has engaged the obstruction, the adjacent frame member 14 and its cooperating swinging axle 16 will swing downwardly upon the housing 11 but upwardly relative to the ground, thereby causing the cooperating spring 17 to swing about its stub shaft 27, so that the adjacent portion of the frame 10 will move upwardly approximately one-half of the total displacement of the obstructed front wheel 13. Although the front wheel 13 may be elevated while the auxiliary wheel 15 of the same set is not necessarily lifted away from the ground, these wheels will always remain in the same plane and will rotate about parallel axes. When the drive wheel 13 passes the obstruction and the trailer wheel 15 of the set encounters the same obstruction by virtue of continued advancement of the vehicle, the front wheel 13 descends toward the ground while the rear wheel 15 rises, thereby causing the interconnected frame member 14 and axle 16 to swing upwardly about the axle housing 11 which has returned to horizontal position, and simultaneously causing the corresponding spring 17 to rock in the opposite direction about its stub shaft 27. During such reverse swinging of the tandem wheel set, the spring 17 again cooperates with the frame member 14 to modify and minimize the motion of the frame 10, and it is to be noted, that since the vehicle chassis frame is supported midway between the ends of the frame members 14 and is supported therefrom through flexible springs 17, only very large obstructions will have a noticeable effect on the position of the frame 10. When both wheels 15 move parallel either up or down, the springs 17 do not move laterally at the loops 33, 34, but merely slide longitudinally.

In the modified assemblage of Fig. 8, 9, and 10, the side beams or frame members 14' and swinging axles 16' are pivotally associated with the axle housing 11 in precisely the same manner as in Figs 1, 2, and 3, but the members 14' are constructed to permit greater angular displacement of the tandem sets of wheels 13, 15. The front pivotal end of each beam member 14' is provided with a relatively high closed loop 33' through which the forward end of the corresponding spring 17 projects. The rear swinging end of each frame member 14' is provided with a similar abutment or loop 34' which is open on the inner side, and within which the rear end of the corresponding spring 17 is located. The rear ends of the swing axles 16' are rigidly attached to the rear ends of the corresponding members 14' and these rear member ends are provided with inwardly extending abutments 39 which are adapted to engage the main frame 10 as shown in dot-and-dash lines in Fig. 8, and to thus limit the upward swinging movement of the rear ends of the corresponding members 14'. The upward movement of the front end of each frame member 14' is obviously limited by contacting of the housing 11 with the lower surface of the frame 10, as shown in solid lines in Figs. 8 and 9, and the downward motion of the front ends of the members 14' is limited by the adjacent cable loops 35 as indicated in dot-and-dash lines in Fig. 8 and in solid lines in Fig. 9. The ends of the springs 17 are slidable with their lower faces in contact with the adjacent upper end surfaces of the beam members 14' during normal transportation over level roads, but may be elevated to bring the upper end surfaces of the springs 17 in contact with the upper portions of the loops 33', 34' under abnormal conditions of operation.

When a vehicle equipped with the modified type of tandem attachment is proceeding over level ground, the operation is the same as described in connection with Figs. 1, 2, and 3, the ends of the springs 17 resting upon the adjacent ends of the frame members 14' within the loops 33', 34'. As the springs 17 are deflected due to the inertia of the load, the opposite ends of the springs slide upon the adjacent ends of the members 14' and thus accommodate deflection of the springs. When the front wheel 13 of one of the tandem sets engages a large obstruction the housing 11 may engage the frame 10 and the rear wheel 15 may drop so that the front wheel 13 carries the entire load. If the rear wheel 15 remains unsupported, the rear end of the adjacent spring 17 will contact the upper portion of the rear loop 34', whereupon the spring will rock about its pivot shaft 27 and the front end thereof will engage the upper portion of the front loop 33' as clearly shown in Fig. 8. Any further tendency toward elevation of the front wheel 13, will cause downward pressure upon the spring ends and will result in lifting of the rear wheel 15 away from the ground. As the vehicle proceeds over the obstruction, the rear wheel 15 will rise and will eventually cause the ends of the spring 17 to again seat upon the top of the beam member 14' and will subsequently cause the housing 11 to move downwardly away from the frame 10. After the front wheel 13 has passed the obstruction, or when the rear wheel 15 encounters an obstruction during reverse travel of the vehicle, the obstructed wheel set assumes the position shown in dot-and-dash lines in Fig. 8. The abutment 39 then engages the frame 10 and the cable loop 35 limits the downward motion of the front wheel 13, but the loop 35 must be of sufficient length to permit the abutment 39 to contact the frame so that the rear wheel will directly support the entire load. The ends of the corresponding spring 17 may then remain in substantial contact with the upper surface of the frame member 14', but do not support the load. The tandem wheel sets on opposite sides of the vehicle may assume these extreme tilted positions independently of each other, and by utilizing the abutments 39 and the ends of the housing 11 as fulcrum points coacting with the frame 10, in conjunction with relatively high loops 33', 34' and with motion limiting cable loops 35, maximum angular displacement of the wheel sets and hence greatest possible flexibility are made possible. This arrangement because of the flexibility afforded, is especially advantageous when the endless tracks 18 are utilized, and eliminates necessity of utilizing the ordinary snubbers for protecting the mechanism when the vehicle is backed into or transported through deep ditches or holes.

The two sets of tandem wheels 13, 15 on the opposite sides of the frame 10 can obviously function in the above described manner independently of each other, and the motion of the rear axles 16 during such independent movement is in no manner obstructed or interfered with either by each other, or by the tie-rod 30. When extreme angular displacement such as illustrated in Figs. 8 and 9 takes place, the spring 17 will shift laterally within the loops 33, 34, so that these loops should provide sufficient clearance without twisting the spring ends.

The wheels 13, 15 may be either idler wheels, or both positively driven, or they may be embraced by endless track mechanisms 18, without affecting their normal action due to engaging obstructions during advancement thereof. The normal functioning of the tandem wheels is moreover the same irrespective of the direction of advancement of the vehicle or the type of wheels employed.

From the foregoing specific description, it will be apparent that the present invention provides a tandem wheel attachment for various types of vehicles, which will materially increase the ground engaging area and which is readily applicable as a unit to standard wheeled conveyances. The improved assemblage is extremely simple and strong in structure, and the tandem wheels of each set are at all times positively confined to rotation in the same plane and about parallel axes. The improved structure will effectively support the chassis frame and will insure uniform distribution of the load, regardless of irregularities in the path of travel, and without in any manner interfering with the vehicle propelling or draft mechanisms, and the improvement permits the use of standard wheels either directly engaging the ground or cooperating with endless track or tread mechanisms. While the improved assemblage has proven highly successful in actual commercial use as applied to light motor trucks, the invention is obviously applicable to other types of trucks with the same advantages, and the structure can be manufactured and operated at relatively moderate cost.

It should be understood that it is not desired to limit the invention to the exact details of structure and to the precise mode of operation herein shown and described, for various modifications within the scope of the claims may occur to persons skilled in the art.

It is claimed and desired to secure by Letters Patent:—

1. In a vehicle, a chassis frame, an axle extending transversely of said frame, a main wheel carried by said axle on each side of said frame, a frame member swingable about an axis closely adjacent the axis of each of said main wheels, an auxiliary wheel rotatably associated with each of said swingable frame members remote from said axle, another axle swingably connecting each of said frame members with a portion of said first mentioned axle at the opposite side of said chassis frame, and means for resiliently supporting said chassis frame relatively to said frame members.

2. In a vehicle, a main frame, an axle extending across said frame, a main wheel carried by said axle on each side of said frame, a frame member swingable about the axis of said axle closely adjacent each of said main wheels, an auxiliary wheel rotatably associated with each of said swingable frame members remote from said axle, another axle swingably connecting each of said frame members with a portion of said first mentioned axle at the opposite side of said main frame, and spring means on opposite sides of said main frame having their medial portions formed to directly support the main frame and their ends movably cooperable with the opposite ends of the adjacent frame members.

3. In a vehicle, a chassis frame, an axle extending across said frame, a main wheel carried by said axle on each side of said frame, a frame member swingable about an axis closely adjacent the axis of each of said main wheels, an auxiliary wheel rotatably associated with each of said swingable frame members remote from said axle, another axle pivotally connecting the auxiliary wheel supporting portion of each of said frame members with the member supporting portion of said first mentioned axle at the opposite side of said chassis frame, and means for resiliently supporting said chassis frame upon said frame members.

4. In a vehicle, a main frame, a main axle extending across said frame, a main wheel carried by said axle on each side of said frame, a frame member swingable about the axis of said axle closely adjacent each of said main wheels, an auxiliary wheel rotatably associated with each of said swingable frame members remote from said axle, an auxiliary axle pivotally connecting the auxiliary wheel supporting portion of each of said frame members with the member supporting portion of said main axle at the opposite side of said main frame, and a leaf spring on each side of said main frame having its medial portion formed to directly support the main frame and having its opposite ends movably cooperable with the opposite ends of the adjacent frame member.

5. In a vehicle, a main frame, a main axle extending across said frame, a main wheel carried by said axle on each side of said frame, a frame member swingable about an axis closely adjacent the axis of each of said main wheels, an auxiliary wheel rotatably associated with each of said swingable frame members remote from said axle, the main and auxiliary wheel of each set lying in a common plane and being constantly rotatable about parallel axes, an auxiliary axle connecting each of said frame members with a portion of said main axle at the opposite side of said main frame, and means for resiliently supporting said main frame upon both of said frame members.

6. In a vehicle, a main frame, a main axle extending across said frame and comprising a housing and alined half-shafts rotatably supported within said housing a main wheel on each of the opposite sides of said frame, each of said main wheels being secured to one of said half-shafts, a frame member swingable upon said housing about an axis closely adjacent the common axis of said half-shafts and closely adjacent to each of said main wheels, an auxiliary wheel rotatably associated with each of said swingable frame members remote from said axle, an auxiliary axle swingably connecting the support of each of said auxiliary wheels with a portion of said main axle housing on the opposite side of said main frame, and means for resiliently supporting said main frame upon portions of said frame members directly adjacent to said wheels.

7. In a vehicle, a frame, a main axle extending transversely beneath said frame and comprising a housing and alined half-shafts rotatably supported within said housing, a driving wheel on each of the opposite sides of said frame, each of said driving wheels being secured to one of said half-shafts, a frame member swingably supported near said housing closely adjacent to each of said drive wheels, a complementary wheel rotatably associated with each of said swingable frame members remote from said axle, said drive and complementary wheels of each set lying in a common plane and being constantly rotatable about parallel axes, an auxiliary axle swingably connecting the support of each of said complementary wheels with a portion of said main axle housing on the opposite side of said chassis frame, and resilient means for supporting said chassis frame upon both of the end portions of both of said frame members closely adjacent to the axes of rotation of said wheels.

8. In a vehicle, a chassis frame, a main axle extending transversely of said frame and comprising a housing and shafting rotatably supported within said housing, a main wheel on each of the opposite sides of said frame, each of said main wheels being secured to an end of said shafting, a frame member having a bifurcated end swingably associated with said housing closely adjacent each of said main wheels, an auxiliary wheel rotatably associated with a swingable portion of each of said frame members, an auxiliary axle secured to each of said frame members adjacent the corresponding auxiliary wheel and pivotally attached to said housing within the bifurcation of the opposite frame member, and means for resiliently supporting said chassis frame upon both of said frame members.

9. In a vehicle, a chassis frame, a main axle extending across said frame and comprising a housing and shafting rotatably supported within said housing, a main wheel on each of the opposite sides of said frame, each of said main wheels being secured to an end of said shafting, a frame member having a bifurcated end swingably supported upon said housing closely adjacent each of said main wheels, an auxiliary wheel rotatably associated with a swingable portion of each of said frame members, the main and auxiliary wheel of each set lying in a common plane and being constantly rotatable about parallel axes, an auxiliary axle secured to each of said frame members adjacent the auxiliary wheel thereof and pivotally attached to said housing within the bifurcation of the opposite frame member, and means for resiliently supporting said chassis frame upon both of said frame members.

10. In a vehicle, two laterally spaced sets of tandem wheels, each set comprising a front and a rear wheel, a main axle connecting corresponding wheels of said sets, a frame member connecting the front and rear wheels of each set, each of said frame members being pivotally associated with said axle closely adjacent to the wheels associated therewith, and another axle associated with the swinging end of each of said frame members and pivotally associated with said main axle closely adjacent to the other of said frame members.

11. In a vehicle, two laterally disposed sets of tandem wheels, each set comprising a front and a rear wheel, an axle connecting corresponding wheels of said sets, a beam member connecting the front and rear wheels of each set, each of said beam members being pivotally associated with said axle closely adjacent to the wheels associated therewith and having loops at its opposite ends, a spring having opposite ends located within the end loops of each beam member, and a radius axle connecting the swinging end of each beam member with the main axle closely adjacent to the other beam member.

12. In a vehicle, a main frame, sets of tandem wheels located at opposite sides of said frame, each set comprising a front and a rear wheel, an axle connecting corresponding wheels of said sets, a beam member connecting the wheels of each set, each of said beam members being pivotally associated with an end portion of said axle and having abutments carried by and spaced upwardly from its opposite ends, a spring carried at each side of said frame and having opposite ends engageable with said abutments of the adjacent beam member, and a radius element connecting the swinging end of each beam member with said axle closely adjacent to the other beam member.

13. In a vehicle, a main frame, sets of tandem wheels located at opposite sides of said frame, each set comprising a front and a rear wheel, an axle connecting corresponding wheels of said sets, a beam member connecting the wheels of each set, each of said beam members being pivotally associated with an end portion of said axle and having abutments carried by and spaced upwardly from its opposite ends, a spring carried at each side of said frame and having opposite ends engageable with said abutments of the adjacent beam member, a radius element connecting the swinging end of each beam member with said axle closely adjacent to the other beam member, and a flexible stop for limiting the movement of each end of said axle away from said main frame.

14. In a vehicle, a main frame, a set of tandem wheels located on each side of said frame, each set comprising a front and a rear wheel, an axle connecting the front wheels of said sets, a beam member connecting the front and rear wheels of each set, each of said beam members being pivotally associated with said axle adjacent an outer side of said frame, and another axle associated with the swinging end of each of said beam members and pivotally associated with said main axle closely adjacent to the other of said beam members.

EDWARD H. SCHULTZ.